United States Patent [19]
Hashimoto

[11] 4,456,930
[45] Jun. 26, 1984

[54] METHOD AND APPARATUS FOR RECORDING AND REPRODUCING A DIGITAL INFORMATION SIGNAL

[75] Inventor: Yoshitaka Hashimoto, Chofu, Japan
[73] Assignee: Sony Corporation, Tokyo, Japan
[21] Appl. No.: 342,348
[22] Filed: Jan. 25, 1982

[30] Foreign Application Priority Data

Jan. 29, 1981 [JP] Japan ................................ 56-12065

[51] Int. Cl.³ .............................................. H04N 9/49
[52] U.S. Cl. .................................. 358/328; 358/320; 358/337; 358/340
[58] Field of Search .............. 358/310, 327, 328, 335, 358/340, 320, 337; 360/32, 33.1, 36.1, 36.2

[56] References Cited

U.S. PATENT DOCUMENTS

| 3,911,483 | 10/1975 | Kihara et al. | 358/340 |
| 4,131,912 | 12/1978 | Hirai | 358/328 |
| 4,290,082 | 9/1981 | Hirai | 358/328 |

FOREIGN PATENT DOCUMENTS 2065416A 11/1980 United Kingdom .

*Primary Examiner*—Richard Murray
*Attorney, Agent, or Firm*—Lewis H. Eslinger; Alvin Sinderbrand

[57] ABSTRACT

A method of recording and reproducing a video signal with respect to a magnetic tape includes the steps of converting the video signal into digital form; distributing the digitized video signal to a plurality of channels; simultaneously recording the digitized video signal in eight parallel tracks extending obliquely on the tape without guard bands therebetween and with the digitized video signal in alternate ones of the tracks being recorded with a first azimuth angle and the digitized video signal in the remaining tracks being recorded with a second different azimuth angle; reproducing the digitized video signal from the eight parallel tracks; grouping the reproduced digitized video signal into two groups, one group including only those portions of the reproduced digitized video signal that were recorded with the first azimuth angle, and the other group including only those portions of the reproduced digitized video signal that were recorded with the second azimuth angle; and processing the reproduced digitized video signal separately for each group. Apparatus for performing the above method is also provided.

27 Claims, 28 Drawing Figures

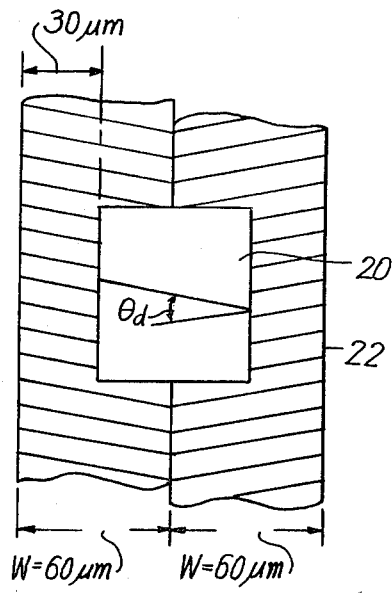
FIG.3A
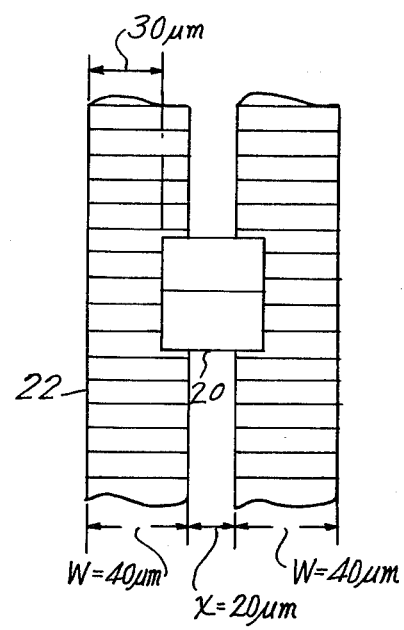
FIG.3B
FIG.4A
FIG.4B
FIG.4C
FIG.4D
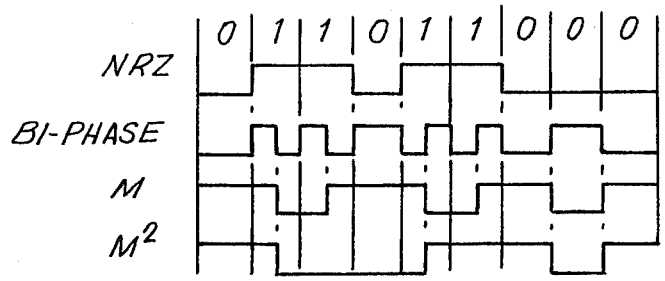
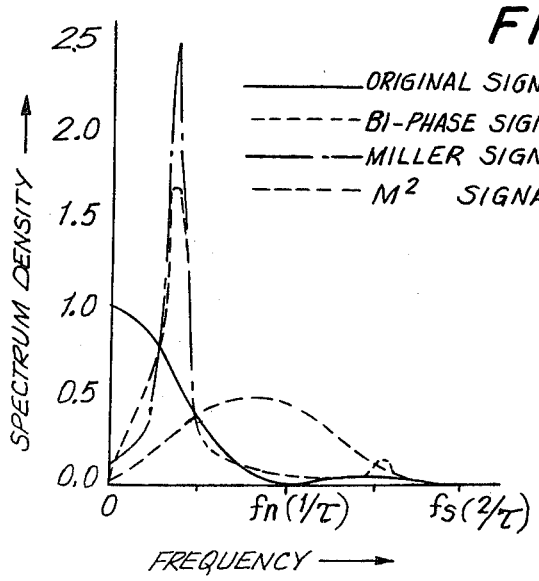
FIG.5
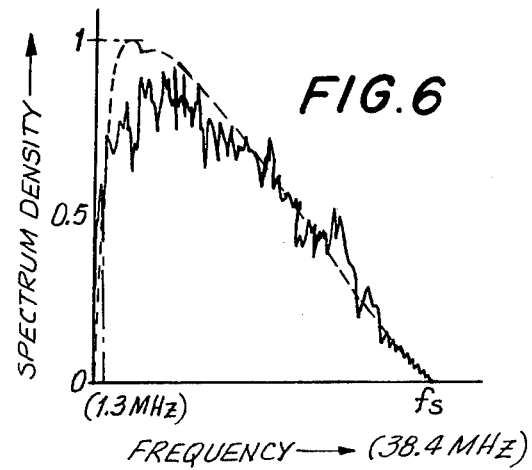
FIG.6

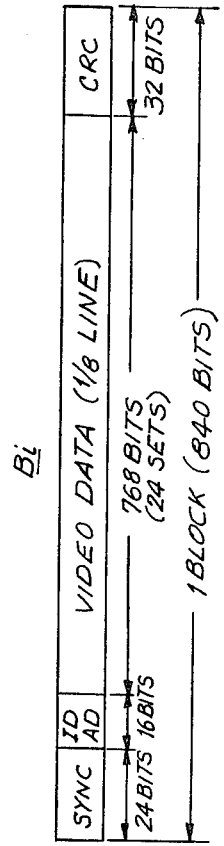
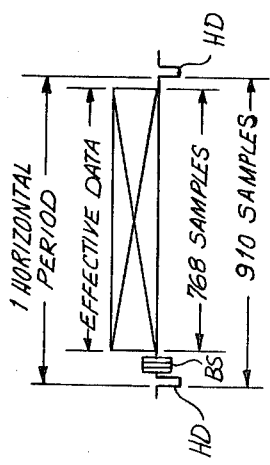
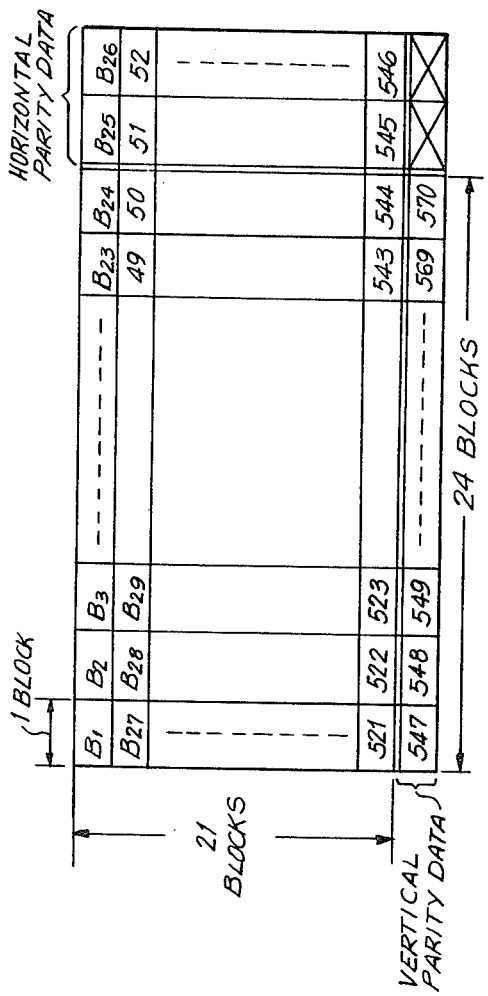

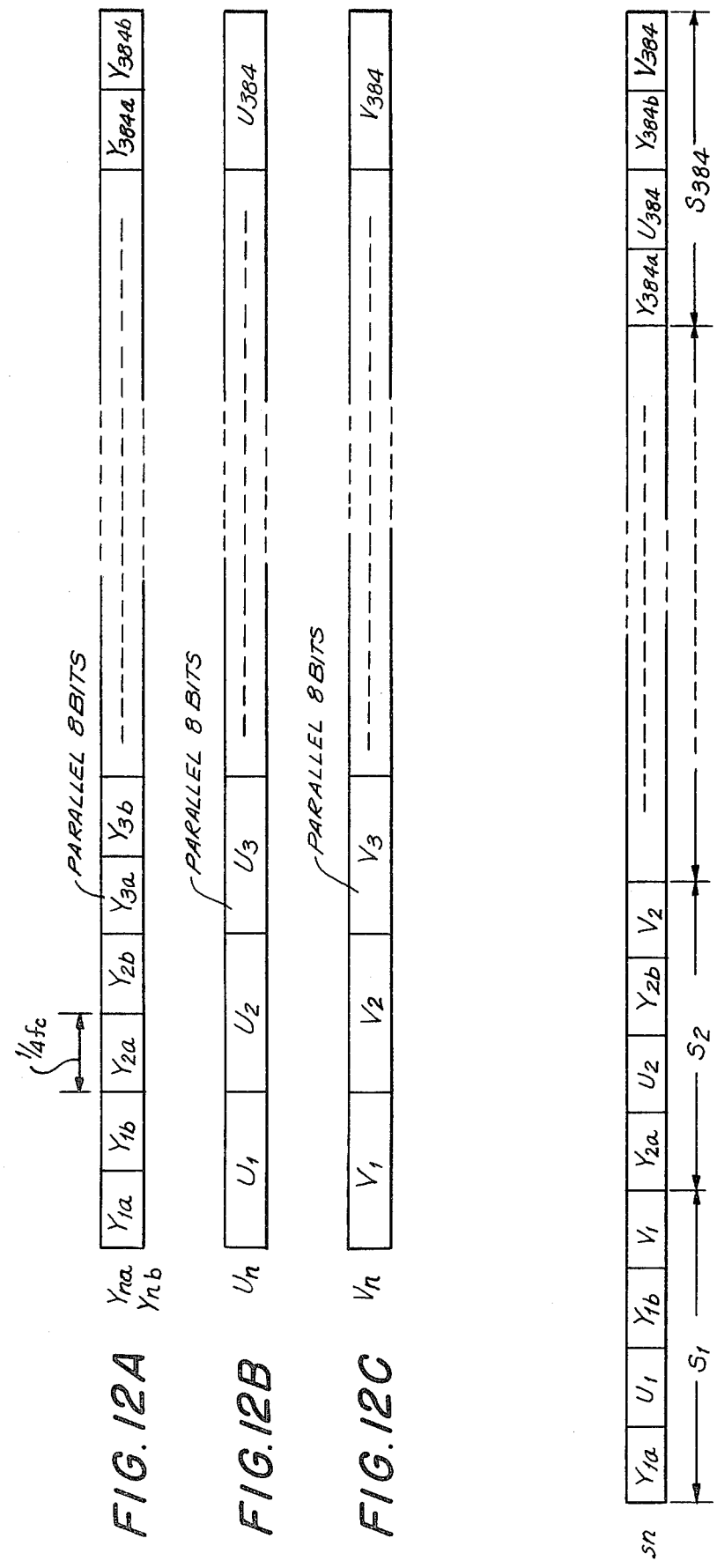

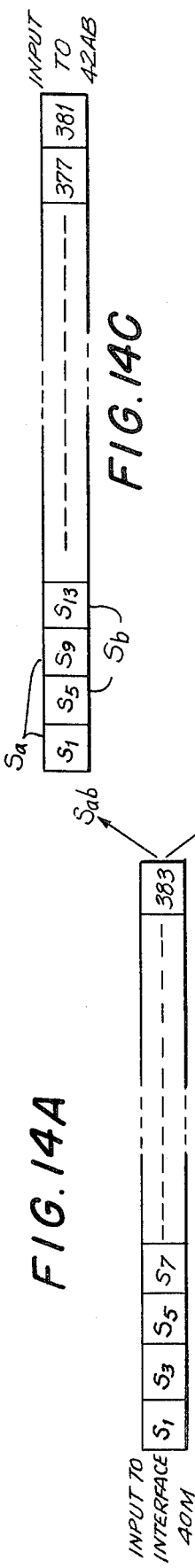

METHOD AND APPARATUS FOR RECORDING AND REPRODUCING A DIGITAL INFORMATION SIGNAL

BACKGROUND OF THE INVENTION

1. Field of the Invention

This invention relates generally to a method and apparatus for recording and reproducing a digitized video signal on a magnetic tape and, more particularly, is directed to a method and apparatus for recording and reproducing a digitized video signal on a magnetic tape with a high recording density.

2. Description of the Prior Art

Conventionally, apparatus for recording and reproducing a video signal on a magnetic tape have been of the analog, rather than digital, type. However, there has been a recent turn torwards development of digital video tape recorders (VTR). Digital VTRs have a very high picture quality, which enables multiple generation dubbing or editing with virtually no picture impairment. Further, digital VTRs provide adjustment free circuits and self-diagnostic systems which enable easier maintenance and higher reliability.

With digital VTRs, an analog video signal is converted into digital form by an A/D (analog-to-digital) converter. In particular, the analog video signal is sampled by clock pulses having a sampling frequency which may be, for example, $4f_{sc}$, where $f_{sc}$ is the color sub-carrier frequency of the color video signal, resulting in the analog video signal being converted into a digitized video signal comprised of 8-bit words. The digitized signal is also coded by an error control encoder so that errors may be corrected and concealed on playback and, it is further coded by a channel encoder to achieve high density digital recording. The coded digitized signal is then recorded on a magnetic tape by means of a recording amplifier. However, it should be appreciated from the above that the recording bit rate, that is, the rate of occurrence of each bit of the digitized video signal, is extremely high. For example, in the above-described embodiment, where the color sub-carrier frequency $f_{sc} = 3.58$ MHz, the recording bit rate is equal to $4f_{sc}$ times the number of bits per word. In other words, the recording bit rate is obtained as follows:

$$\text{Bit rate} = 4 \times 3.58 \times 10^6 \times 8 = 114.6 \text{ Mb/s.}$$

Because of such high recording bit rate, the digitized video signal is not suitable for recording in a single recording channel.

Accordingly, it has been proposed to separate the digitized video signal into at least two separate channels prior to recording it on a magnetic tape so as to reduce the recording bit rate per channel. Typically, a magnetic head is associated with each channel and all of the magnetic heads are aligned to record the respective channels on a magnetic tape in parallel tracks extending obliquely on the tape, without guard bands between adjacent tracks and with the signals in alternate tracks being recorded with different azimuth angles. In this manner, the tape consumption using a digital VTR is not greater than that of an analog VTR. In order to separate the digitized video signal into, for example, two channels, an interface is provided which distributes succesive 8-bit words of the digitized video signal into the respective channels by means of an identification signal added to the digital signal.

However, in such case where the digitized video signal is separated into a plurality of channels, each of the channels must separately process the video signal therein. This, of course, makes the circuitry complicated and expensive. For example, the interchanger that must be provided to distribute the reproduced signals to the correct channels during a special reproducing mode in which each head traces a plurality of record tracks, becomes complicated. Further, because of such complicated circuitry, it is inconvenient and troublesome when it is desired to perform any maintenance or check opertion to ensure that the video signal is accurately reproduced.

Further, different VTRs vary in complexity. For example, a low-grade VTR, such as an ENG (electronic news gathering) machine, may use less channels than a standard VTR which, in turn, may use less channels than a high-grade mastering VTR. If common reproduction processing apparatus is provided for all of the above machines, such apparatus must include processing circuitry capable of being used with the most complex or high-grade mastering VTR. For example, if the high-grade mastering VTR uses sixteen channels, a complex interchanger must be provided for correctly separating the channels during a special reproducing mode. If it is desired to use a simple ENG machine, the same complex interchanger must be used. This, of course, is unnecessary.

OBJECTS AND SUMMARY OF THE INVENTION

Accordingly, it is an object of this invention to provide a method and apparatus for recording and reproducing a digitized video signal on a magnetic tape that avoids the above-described difficulties encountered with the prior art.

It is another object of this invention to provide a method and apparatus for recording and reproducing a digitized video signal in which the digitized video signal is distributed to a plurality of channels and then the digitized video signal in each channel is recorded in a plurality of parallel tracks extending obliquely on a magnetic tape without guard bands between adjacent tracks and with the digitized video signal in adjacent tracks being recorded with different azimuth angles.

It is still another of this invention to provide a method and apparatus for recording and reproducing a digitized video signal in which the digitized video signal is recorded in a plurality of parallel tracks extending obliquely on a magnetic tape without guard bands between adjacent tracks, with the digitized video signal in adjacent tracks being recorded with different azimuth angles, and with the digitized video signals, when reproduced, being processed in groups, with each group including only those portions of the reproduced digitized video signal that were recorded with the same azimuth angle.

It is yet another object of this invention to provide a method and apparatus for recording and reproducing a digitized video signal in which maintenance and check of the apparatus can easily be performed to ensure that the video signal is accurately reproduced.

It is a further object of this invention to provide a method and apparatus for recording and reproducing a digitized video signal that is relatively simple in construction and use.

In accordance with an aspect of this invention, apparatus is provided for reproducing a digitized video signal which has been simultaneously recorded in at least three parallel tracks on a record medium without guard bands therebetween and with the digitized video signal in adjacent ones of the tracks being recorded with different azimuth angles, the apparatus comprising means for reproducing the digitized video signal from the at least three parallel tracks; means for grouping the reproduced digitized video signal into at least two groups, each group including only those portions of the reproduced digitized video signal that were recorded with the same azimuth angle, and each group including portions of the reproduced digitized video signal that were recorded with a different azimuth angle than portions of the reproduced digitized video signal in at least one other group; and means processing the reproduced digitized video signal separately for each group.

In accordance with another aspect of this invention, apparatus is provided for recording and reproducing a video signal with respect to a record medium, comprising a recording section including means for converting the video signal into digital form; and means for simultaneously recording the digitized video signal in at least three parallel tracks on the record medium without guard bands therebetween and with the digitized signal in adjacent ones of the tracks being recorded with different azimuth angles; and a reproducing section including means for reproducing the digitized video signal from the at least three parallel tracks; means for grouping the reproduced digitized video signal into at least two groups, each group including only those portions of the reproduced digitized video signal that were recorded with the same azimuth angle, and each group including portions of the reproduced digitized video signal that were recorded with a different azimuth angle than portions of the reproduced digitized video signal in at least one other group; and means for processing the reproduced digitized video signal separately for each group.

In accordance with still another aspect of this invention, a method of reproducing a digitized video signal which has been simultaneously recorded in at least three parallel tracks on a record medium without guard bands therebetween and with the digitized video signal in adjacent ones of the tracks being recorded with different azimuth angles, includes the steps of reproducing the digitized video signal from the at least three parallel tracks; grouping the reproduced digitized video signal into at least two groups, each group including only those portions of the reproduced digitized video signal that were recorded with the same azimuth angle, and each group including portions of the reproduced digitized video signal that were recorded with a different azimuth angle than portions of the reproduced digitized video signal in at least one other group; and processing the reproduced digitized video signal separately for each group.

In accordance with yet another aspect of this invention, a method of recording and reproducing a video signal with respect to a record medium, includes the steps of converting the video signal into digital form; simultaneously recording the digitized video signal in at least three parallel tracks on the record medium without guard bands therebetween and with the digitized video signal in adjacent ones of the tracks being recorded with different azimuth angles; reproducing the digitized video signal from the at least three parallel tracks; grouping the reproduced digitized video signal into at least two groups, each group including only those portions of the reproduced digitized video signal that were recorded with the same azimuth angle, and each group including portions of the reproduced digitized video signal that were recorded with a different azimuth angle than portions of the reproduced digitized video signal in at least one other group; and processing the reproduced digitized video signal separately for each group.

The above, and other, objects, features and advantages of the present invention, will be apparent from the following detailed description which is to be read in connection with the accompanying drawings.

BRIEF DESCRIPTION OF THE DRAWINGS

FIGS. 3A and 3B are schematic diagrams illustrating the tracking by a magnetic head with apparatus according to this invention and with previously proposed apparatus for a digitized video signal;

FIGS. 4A–4D waveform diagrams of various digital code converting formats;

FIG. 5 is a graphical diagram of the frequency spectrum density for the various formats shown in FIGS. 4A–4D;

FIG. 6 is a graphical diagram of the frequency spectrum density illustrating the reduction of low frequency components by means of an 8-to-10 code conversion system;

FIGS. 9, 10 and 11 are schematic diagrams to which reference will be made in explaining the digitization and code arrangement of a video signal for use in a digital VTR embodying this invention;

FIGS. 12, 13 and 14 are schematic diagrams illustrating the distribution of the signals into the respective with the recording section of FIG. 7;

DETAILED DESCRIPTION OF THE PREFERRED EMBODIMENTS

Figure 1:
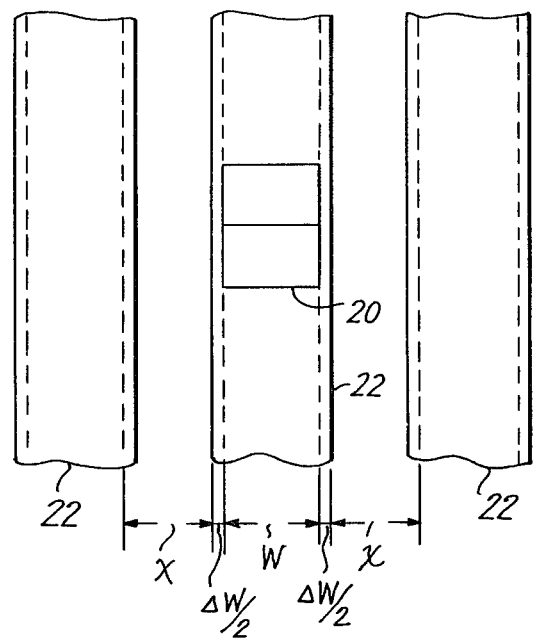
FIG. 1 is a schematic diagram used for explaining the recording of a digitized video signal in parallel tracks with guard bands between adjacent tracks, according to a previously proposed method of recording a digitized video signal.

In order to facilitate a better understanding of the present invention, there will first be described the conditions for digital recording of a color video signal with a high signal-to-noise (S/N) ratio and a high recording density.

Where a digitized video signal is transmitted, a tolerable bit error rate in the transmission of the digitized signal is $1\times 10^{-7}$. Since the S/N ratio of a transmission path (where the signal is measured by its peak-to-peak value and the noise is measured by an effective value) is more than 20 dB when the bit error rate is slightly less than $1\times 10^{-7}$, the S/N ratio of a digitized color video signal obtained, during reproduction from a digital VTR, must be larger than 20 dB.

In addition to the requirement for a sufficiently high S/N ratio, it is also desirable to reduce the tape consumption so as to obtain maximum utilization of the magnetic tape. This, of course, means that the digital video signal must be recorded with a high bit density. In order to obtain such high bit density recording, the number of recorded bits per unit area of tape S (recording bit density) must be high, in which the recording bit density is expressed by the following equation:

$$S = L \cdot T \qquad (1)$$

where L is the line bit density, that is, the number of recorded bits per unit length in the lengthwise direction of the track, and T is the track density, that is, the number of recorded bits per unit length in the widthwise direction of the track. Generally, as the value of the line bit density L increases, a short wavelength for recording must be utilized.

Assuming that the magnetic layer on the tape is sufficiently thick, it has been determined that the number of magnetic particles which are activated so as to change the magnetic flux supplied to the reproducing head increases approximately in proportion to the square of the recording wavelength utilized. Further, the signal voltage generated at the reproducing head increases in proportion to the number of activated magnetic particles, while the noise voltage generated at the reproducing head increases in proportion to the square root of the number of activated magnetic particles. In other words, the signal voltage generated at the reproduced head increases in a proportional manner to the square of the wavelength and the noise voltage generated at the reproducing head increases in a proportional manner to the wavelength. Thus, if it is assumed that the source of noise results only from the tape, that is, the activated magnetic particles thereon, the S/N ratio of the reproduced digitized signal increases in a proportional manner to the wavelength. Further, the S/N ratio for the amplifier system of the VTR is also proportional to the wavelength. It should therefore be appreciated that if the track width and the relative speed between the reproducing head and the tape are constant, the S/N ratio increases as the recording wavelength increases. However, it should be appreciated that this is contrary to the condition of high bit density recording where it is desirable to utilize a short wavelength in order to increase the line bit density L, and consequently, to thereby increase ther recording bit density S.

In regard to the track density T, the signal voltage and tape noise voltage generated at the reproducing head each decrease in a proportional manner to reductions in the track width W. However, if the noise is generated only from the tape, the noise voltage generated at the reproduced head is only in proportion to the square root of the track width W. In such case, the S/N ratio of the reproduced digitized signal is proportional to the square root of the track width W.

In regard to the noise from the VTR, the inductance of the reproducing head is approximately proportional to the width of the reproducing head, that is, to the track width W. When the inductance of the reproducing head is constant, the number of turns of windings on the head are inversely proportional to the square root of track width W. Further, the magnetic flux linked with the windings of the head is proportional to the track width W. It should therefore be appreciated that, with the inductance of the reproducing head maintained at a constant value, the voltage induced in the reproducing head is proportional to the number of turns N times the magnetic flux $\phi_b$ intersecting the windings. In other words, the voltage E induced in the reproducing head is proportional to the square root of the track width W. Further, if the inductance of the reproducing head is constant, the noise generated by the reproducing head amplifier is also constant. Thus, assuming that the source of noise only results from the reproducing head amplifier, the S/N ratio of the reproduced digitized signal is proportional to the square root of the track width W. If he generated noise from the tape and from the reproducing head amplifier are independent of each other, the S/N ratio of the reproduced digitized signal, as a result of the combined noise from the tape and the reproducing head amplifier, is proportional to the square root of the track width W. In other words, reduction of the track width W so as to increase the track density T results in a deterioration of the S/N ratio.

It should be appreciated from the above that the recording bit density S is increased by reducing the track width W so as to increase the track density T and by utilizing a short recording wavelength so as to increase the line bit density L. However, such conditions result in a deterioration of the S/N ratio. It should therefore be appreciated that the conditions for increasing the S/N ratio while increasing the recording bit density S are contrary to one another.

In order to compensate for the above, previously proposed digital video tape recorders have recorded the video signal in a plurality of parallel tracks extending obliquely on a magnetic tape with guard bands between adjacent tracks, as shown in FIG. 1. This results in a reduction of cross-talk noise interference caused by leakage magnetic flux from adjacent tracks with a consequent increase in the S/N ratio. Of course, such cross-talk interference relates only to the noise generted by the tape and not from the reproducing head amplifier. However, in such case, if the track density T is increased, that is, the track width W is decreased, so as to increase the recording bit density S, the guard bands between adjacent tracks are also reduced. This results in increased cross-talk noise interference from adjacent tracks. Also, in such case, when the track width W becomes too narrow, tracing of the tracks by the reproducing heads becomes difficult so that incorrect tracing is apt to occur with a consequent deteriortion of the S/N ratio.

Before proceeding further, the above-mentioned cross-talk interference from adjacent tracks will be discussed. Referring first to FIG. 1, there is shown a reproducing head 20 having a width W and a plurality of parallel recorded tracks 22 with guard bands between adjacent tracks. The width of the tracks is equal to the head width W and a magnetized width $\Delta W$ caused by fringe flux and which is equally divided on both sides of each track so that a fringe flux width $\Delta W/2$ extends in the widthwise direction on both sides of each track. Given that the width of each guard band is equal to x, the wavelength of the recorded signal is λ, the level of the desired or true recorded signal is E, and the level of the cross-talk signal is $E_c$, the cross-talk interference component $C_t$ can be expressed by the following equation:

$$C_t = 20 \log (E_c/E) = A + B \cdot x/\lambda \text{ db} \qquad (2)$$

where $$A = 20 \log \frac{1}{K} \cdot \frac{\lambda}{b} e^{\frac{b\Delta W}{2\lambda}} \left(1 - e^{-\frac{b(W+\Delta W)}{\lambda}}\right) e^{-\frac{bx}{\lambda}} \qquad (3)$$

$$K = W + \frac{2\lambda}{b}\left(1 - e^{-b\frac{\Delta W}{2}}\right) \qquad (4)$$

Further, it is assumed that $x \gg \Delta W$ and, by experiment, it has been determined that $\Delta W \approx 0.67\lambda$, $b \approx 6.9$ and $B \approx -60$.

Figure 2:
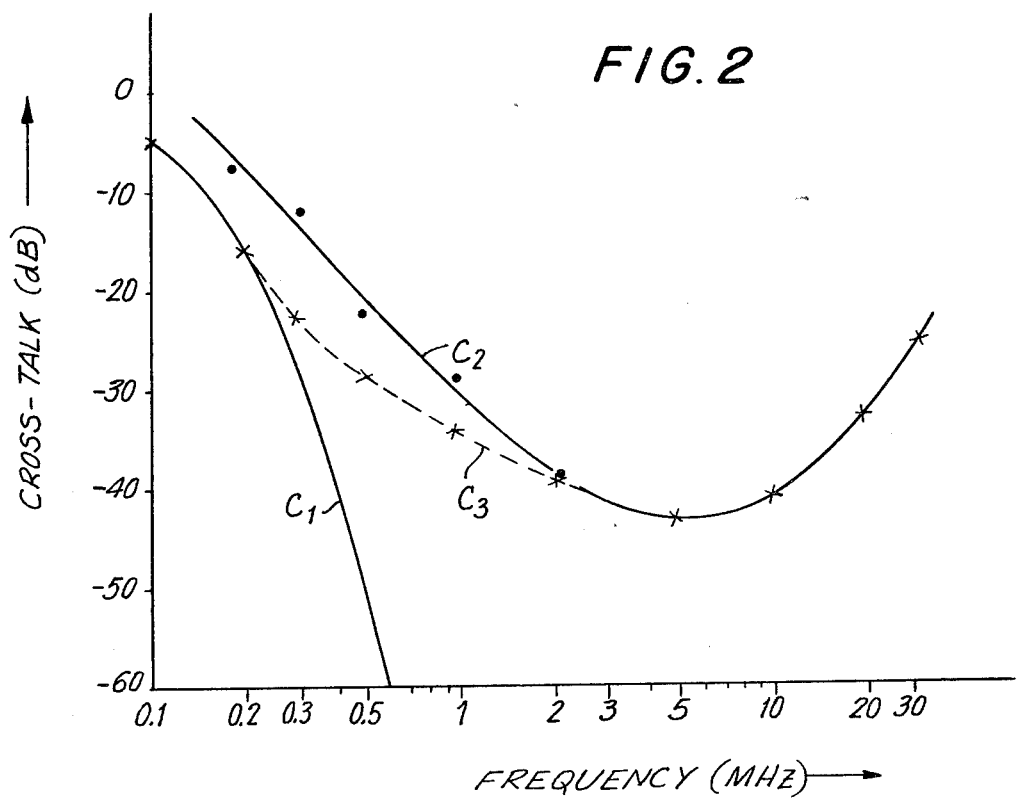
FIG. 2 is a graphical diagram illustrating the crosstalk characteristics of, the previously proposed method of FIG. 1 and the method according to this invention.

If values for the track width W and the guard band width x are chosen as 40 μm and 20 μm, respectively, from equation (2), when the relative speed of the reproducing head of the tape is 25.59 m/sec, the frequency characteristic for the theoretical cross-talk component is shown by curve C1 in FIG. 2. In other words, curve C1 represents the cross-talk interference resulting from the two end tracks in FIG. 1 when head 20 traces the center track of FIG. 1. It should be appreciated from this curve that the level of the cross-talk interference is substantially increased for low frequency components of the video signal. It should further be appreciated that the reduction of guard band width x and, of track width W, necessarily results in the tracks being closer to one another so as to result in increased cross-talk interference. Therefore, there is a limit to the reduction of guard band width x in order to provide that a picture can be reproduced with good quality.

Further, as previously discussed, as the track width W is decreased, it becomes difficult to accurately trace each track. In other words, reproducing head 20 is apt to deviate from the desired path of the recording track. This, of course, results in a substantial increase in cross-talk interference from adjacent tracks. Although the tracking accuracy can be improved by various servo techniques, it is fundamentally determined by the mechanical accuracy of the system which cannot be accurately controlled. In this manner, it should be appreciated that because of mistracking and cross-talk interference from adjacent tracks, the track width W and guard band width x can only be reduced by a certain amount in order to increase the recording bit density S.

Referring now to FIGS. 2 and 3, and in accordance with the present invention, the digitized color video signal is distributed to a plurality of channels and the signals from the channels are recorded by recording heads associated with each of the respective channels in adjacent parallel tracks extending obliquely on a magnetic tape with the longitudinal edges of the adjacent tracks being in contact with each other so as to eliminate any guard bands therebetween. Further, the digitized signal is recorded so that the azimuth angles in adjacent tracks are different from one another, with the azimuth angle for each track being defined by the angle between the direction of the air gap of the recording head utilized and a reference direction, for example, the direction perpendicular to the longitudinal direction of the track. Preferably, the azimuth angles θ in adjacent tracks are equal, but opposite, as shown in FIG. 3A. During reproduction, reproducing heads with air gaps having the same direction as those of the respective recording heads trace the respective tracks to reproduce the digitized video signal therefrom. By utilizing such arrangement, cross-talk interference between adjacent tracks is substantially reduced as a result of azimuth loss. Such azimuth loss $L_a$, during reproduction, as a result of the recording of the video signal in adjacent tracks with different azimuth angles, can be expressed as follows:

$$L_a = 20 \log \left| \frac{\sin \frac{\pi W}{\lambda} \tan \theta}{\frac{\pi W}{\lambda} \tan \theta} \right| dB \qquad (5)$$

where θ represents the azimuth angle relative to a reproducing (or recording) head 20 and recording track 22. It should be appreciated from equation (5) that, if the relative speed of head 20 to the tape is constant, the azimuth loss $L_a$ increases with decreasing wavelength λ, that is, with increasing frequency. In this manner, the digital video signal is code converted in order to reduce the low frequency spectrum components thereof so as to provide an increased azimuth loss $L_a$.

A specific example will now be illustrated for comparing the recording according to this invention with the previously discussed recording which provides guard bands between adjacent tracks. As shown in FIG. 3A, the digitized video signals from two channels are recorded in adjacent tracks 22 with a differential azimuth angle θ between the adjacent tracks which is selected as 14°, and the width W of each track is selected as 60 μm with no guard bands therebetween. When reproducing head 22 (with a correct air gap angle) traces a respective one of tracks 22 of FIG. 3A, the cross-talk component from the adjacent track is shown by curve C2 in FIG. 2. In comparison, from measured values, when the track width W is selected as 40 μm, the width x of each guard band is selected as 20 μm and the azimuth angle θ for all tracks is selected as 0°, as shown in FIG. 3B, and when reproducing head 20 scans one of tracks 22 in FIG. 3B, the actual cross-talk component from the adjacent track is represented by curve C3 in FIG. 2. The above curves C2 and C3 were obtained for the case where the relative speed of the reproducing head to the tape was equal to 25.59 m/sec.

From curve C2 according to this invention, for frequencies lower than approximately 2 MHz, the cross-talk component decreases with increasing frequencies up to approximately 2 MHz. When the frequency is higher than 2 MHz, the cross-talk interference between adjacent tracks increases with increasing frequency due to coupling between the heads and the like. In the actual curve C3 in which the recorded tracks have guard bands therebetween for frequencies lower than about 200 KHz, the cross-talk curve becomes coincident with the theoretical curve C1. Above 200 KHz, curve C3 follows a similar pattern to that of curve C2 in which the cross-talk interference from adjacent recorded tracks decreases with increasing frequencies up to about 2 MHz and thereafter, increases with increasing frequencies. Further, from a comparison of curves C2 and C3, it is seen that, for frequencies lower then about 1 MHz, the cross-talk component, in the case of aximuth recording according to this invention, is greater than the cross-talk component in the cse of normal recording with guard bands, by only 4 to 6 dB. In the frequency range greater than 1 MHz curves C2 and C3 are substantially coincident so that the cross-talk components are approximately equal.

It should be appreciated that the tape consumption is the same for normal recording with guard bands, shown in FIG. 3B, and azimuth recording without guard bands according to this invention, shown in FIG. 3A. Further, the cross-talk interference between adjacent tracks for the two recordings is substantially the same. However, as previously discussed, the S/N ratio of the reproduced digital signal is proportional to the square root of the track width W. Thus, as the track W is increased, the level of the reproduced signal, and consequently, the S/N ratio, also increases. It should therefore be appreciated that the overall S/N ratio for the recording according to this invention, as shown in FIG. 3A, is higher than that for the recording shown in FIG. 3B. In particular, the S/N ratio for the recording according to this invention is greater than that for the recording shown in FIG. 3B by an amount $20 \log \sqrt{60/40} = 1.76$ dB.

Further, upon the occurrence of a tracking error by the reproducing head, it should be appreciated that the S/N ratio of the reproduced signal for the recording as shown in FIG. 3A is even higher than the aforementioned 1.76 dB over that for the recording shown in FIG. 3B. For example, when reproducing head 20 is displaced so as to trace two adjacent tracks by an equal amount, as shown in FIGS. 3A and 3B, any deterioration of the S/N ratio for the recording in FIG. 3A is substantially reduced as a result of azimuth loss. However, when reproducing from the recorded tracks shown in FIG. 3B by reproducing head 20 which equally overlaps the two tracks, the S/N ratio is 0 dB since the amount of cross-talk interference picked up from the non-desired track is equal to the level of the signal from the track desired to be traced. It should therefore be appreciated that the utilization of azimuth recording with no guard bands between adjacent tracks provides a greatly improved recording over that previously proposed. In other words, by utilizing an azimuth recording, there is obtained a high S/N ratio while also providing high bit density recording.

There is, however, a limit to the value of the azimuth angle $\phi$. In particular, the effective recording wavelength $\lambda_e$ can be expressed as follows:

$$\lambda_e = \lambda \cos\theta \quad (6)$$

where is the actual recording wavelength utilized. From equation (6), it should be appreciated that the effective recording density is lowered, and consequently, the recording is easily effected by spacing and gap loss when the effective recording wavelength $\lambda_e$ is small. Since the effective recording wavelength $\lambda_e$ decreases as the azimuth angle $\theta$ increases, the differential azimuth angle $\theta_d$ between tracks cannot be selected too large. It has been ascertained by experiment that the differential azimuth angle $\theta$ is preferably selected in the range of 10° to 30° in order to provide high density recording.

As previously discussed in regard to equation (5), the azimuth loss $L_a$ increases as the recording frequency increases. In like manner, when the recording frequency is low, the azimuth loss $L_a$ is also low. This is seen more particularly by curve C2 in FIG. 2 which illustrates an increase in the cross-talk interference with decreasing frequencies below approximately 2 MHz. It should be appreciated that the cross-talk interference between tracks is considered as a noise signal, in addition to other previously-mentioned noise components, which results in a deterioration of the S/N ratio of the reproduced digital signal. Since the S/N ratio for the reproduced digital signal must be greater than 20 dB, as previously discussed, the level of the cross-talk interference must be lower than approximately −30 dB. Thus, for example, in the case of azimuth recording shown by curve C2 in FIG. 2, the level of the cross-talk interference is lower than −30 dB when the recording frequency is in the range of approximately 1 MHz to 25 MHz. However, the digitized video signal converted from the analog video signal includes many components with frequencies less than 1 MHz. In this manner, the occurrence of low frequency signal components of the digitized video signal is reduced so as to substantially reduce cross-talk interference which cannot satisfactorily be eliminated by means of azimuth loss.

In particular, the present invention utilizes a code conversion system in which the digitized video signal is code converted to eliminate or at least substantially reduce such low frequency components in the digitized signal. Various types of code conversion systems are known in the art. For example, if the original digitized signal is an NRZ (non-return-to-zero) signal (FIG. 4A), it may be code converted to, for example, a bi-phase code signal (FIG. 4B), a Miller code signal (FIG. 4C) or an $M^2$ or modified Miller code signal (FIG. 4D), the frequency spectra of such signals being shown in the graph of FIG. 5, respectively. In the graphical diagram of FIG. 5, $\tau$ represents the bit period, $f_s$ represents the transmitting frequency (that is, the recording bit rate), and $f_n$ represents the Nyquist frequency. It should be appreciated that when the digitized signal is converted from the analog signal, it is in parallel form. However, upon recording, the digitized signal is converted from parallel form to serial form and the transmitting frequency $f_s$ is the frequency of the serial digitized signal. It should further be appreciated from FIG. 5 that the above code conversion systems, that is, bi-phase, Miller and $M^2$, reduce the low frequency components of the digitized signal in comparison to the original NRZ digitized signal (FIG. 4A).

In accordance with another code conversion system, the digitized signal is code converted in an 8-to-10 code conversion process, that is, a digitized signal comprised of 8-bit words is converted to a digitized signal comprised of 10-bit words. The broken line in FIG. 6 represents the theoretical frequency distribution with such 8-to-10 conversion process and the solid line represents the actual frequency distribution thereof. Preferably, the block coding is such that $2^8$ codes whose DC levels are close to zero are selected from $2^{10}$ codes of 10-bit words and arranged to have one-to-one correspondence to the original 8-bit codes, as specifically disclosed in detail in U.S. patent application Ser. No. 06/171,481, filed July 23, 1980, having a common assignee herewith and which is incorporated herein by reference. By means of this process, the DC level of the recorded signal is made as close to zero as possible, that is, "0" and "1" bits alternate with each other as much as possible. Thus, for example, if $f_s$ equals 38.4 MHz, as shown in FIG. 6, the lower cut-off frequency at which the frequency spectrum is evenly divided in half is approximately 1.3 MHz, and in the frequency range lower than this cut-off frequency the frequency spectrum falls sharply. In this manner, the occurrence of low frequency components of the digitized signal, that is, components having a frequency below 1.3 MHz which result in the level of cross-talk interference being above −30 dB (FIG. 2), is substantially reduced. Thus, the azimuth loss $L_a$ is substantially increased so as to more effectively reduce cross-talk interference from adjacent tracks. In this manner, high density recording is achieved while reproduced digital signals from the recorded tracks have a high S/N ratio.

There will now be described an apparatus according to this invention for performing the above-described method of recording a digitized video signal in a plurality of parallel tracks extending obliquely on the magnetic tape without guard bands between at least some of the adjacent tracks and with the digitized video signal in some of the parallel tracks being recorded with an azimuth angle which is different from the azimuth angle in other ones of the parallel tracks. However, in order to facilitate a better understanding of this aspect of the present invention, there will be first described the conditions for digital recording of, for example, an NTSC color video signal.

The NTSC system color video signal is desirably digitized with the following conditions being established:

1. Since one frame comprises 525 lines, the number of lines selected for a first (third) and a second (fourth) field are 262 and 263, respectively. In the first field, a vertical synchronizing pulse and a horizontal synchronizing pulse are in phase with each other, and the field in which they are out of phase is considered the second field.

2. The number of sampled picture elements in each horizontal period (H) varies with the sampling frequency ($f_s$) employed. Since the color sub-carrier frequency ($f_{sc}$) is 455/2 times the horizontal frequency ($f_H$), the numbers of sampled picture elements in one horizontal period are as shown in the below Table 1 in the case of $f_s = 3f_{sc}$ and in the case of $f_s = 4f_{sc}$.

TABLE 1

| $f_s$ | | Even line | Odd line |
|---|---|---|---|
| $3f_{sc}$ | Odd frame | 682 | 683 |
| | Even frame | 683 | 682 |
| $4f_{sc}$ | Odd frame | 910 | 910 |
| | Even frame | 910 | 910 |

Apparatus for performing the previously-described recording arrangement according to the present invention will hereinafter be described with reference to a recording section (FIG. 7) and a playback or reproducing section (FIG. 8) of a digital VTR which will now be described in greater detail. In the digital VTR, a digitized video signal is recorded by a rotary head assembly (FIG. 16) in parallel tracks extending obliquely on a magnetic tape 24 (FIG. 17). Since the transmitting bit rate of the digital video signal is high, as previously discussed, eight rotary heads 20A, 20B, 20C, 20D, 20E, 20F, 20G and 20H (FIG. 15) are disposed in close proximity to each other, and the digitized video signal of one field is distributed through four channels to such heads and recorded on the magnetic tape in eight parallel tracks.

Figure 7:
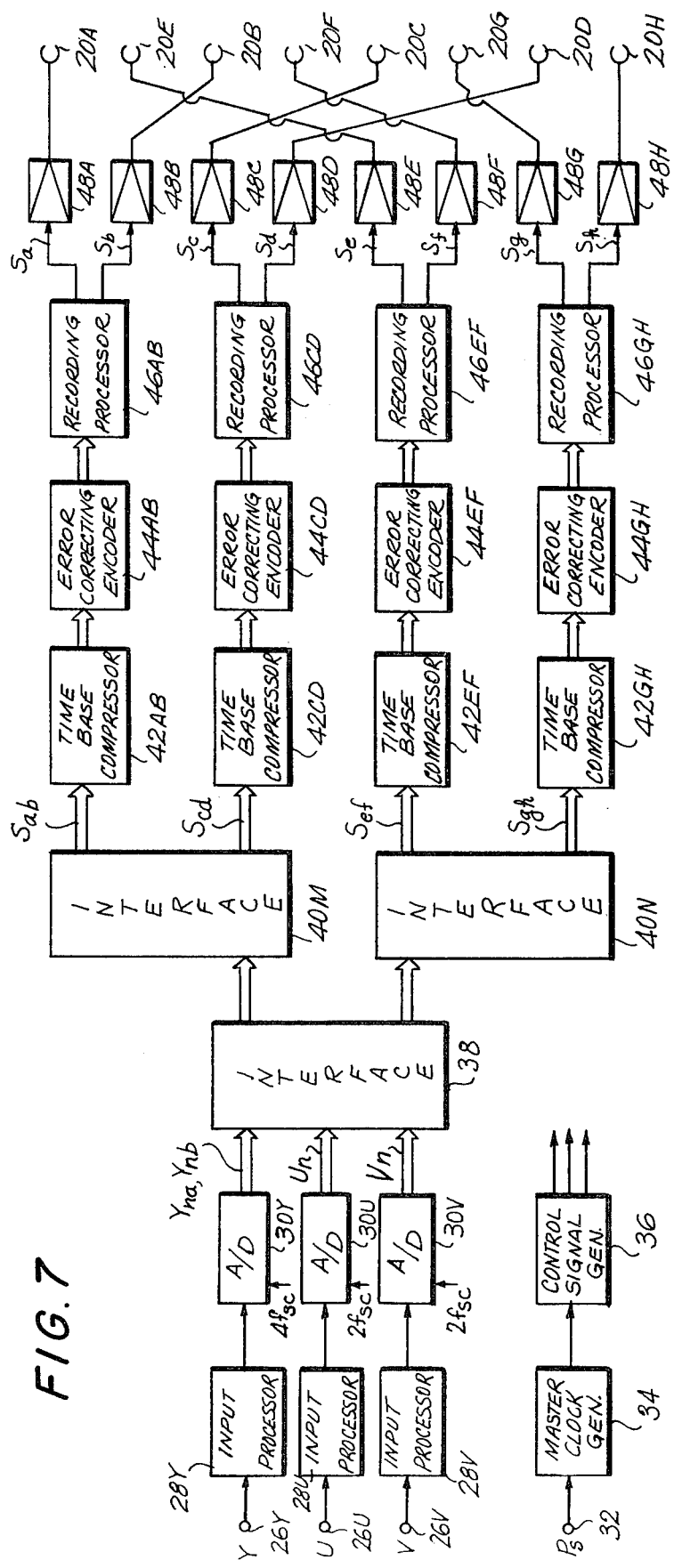
FIG. 7 is a block diagram illustrating a recording section of a digital video tape recorder (VTR) embodying this invention.

Referring in detail to FIG. 7, it will be seen that the luminance component Y, the red difference signal U and the blue difference signal V of an NTSC color video signal to be recorded is applied through input terminals 26Y, 26U and 26V to input processors 28Y, 28U and 28V, respectively. Each input processor 28Y, 28U and 28V comprises a clamp circuit and a synchronizing and burst signal separator and supplies the effective or video information portion of the signal to an A/D converter circuit 30Y, 30U and 30V, respectively. A synchronizing signal $P_s$ and a burst signal separated from the color video signal by one or more of processors 28Y, 28U and 28V are applied through a terminal 32 to a master clock generator 34 which is desirably of PLL (phase-locked loop) construction. The master clock generator 34 generates clock pulses of the sampling frequency, for example, $4f_{sc}$ or 4 times the frequency of the burst signal. The clock pulses from generator 34 and the synchronizing signal are applied to a control signal generator 36 which produces various kinds of timing pulses, identifying signals (ID) for identifying lines, fields, frames and tracks, and a control signal, such as, a train of sampling pulses.

The A/D converter circuits 30Y, 30U and 30V each generally comprise a sample-and-hold circuit and an A/D converter for converting each sampled output to an 8-bit code, as shown in FIGS. 12A, 12B and 12C, and which is supplied, in parallel form, to an interface 38. A sampling frequency of $4f_{sc}$ is used with A/D converter circuit 30Y, while a sampling frequency of $2f_{sc}$ is used with A/D converter circuits 30U and 30V. The duration or period of one line (1H) of the NTSC color video signal is 63.5 μs and a blanking period therein is 11.1 s. Accordingly, the period of the effective video region or portion is 52.4 μs. When the sampling frequency is $4f_{sc} = (4 \times 455)/2 \, f_H$, where $f_H$ is the horizontal frequency, the number of samples in one horizontal period is 910. Further, in such case, the number of samples in the effective video region or portion is 768 samples, as shown in FIG. 9. In consideration of the division of the video information to be recorded into four channels, the number of effective video samples is selected to be 768 per line or horizontal period with 192 samples being assigned to each channel. In FIG. 9, HD represents the horizontal synchronizing signal and BS represents the burst signal.

The number of lines forming one field is 262.5 H, with a vertical synchronizing period and an equalizing pulse period accounting for 10.5 H. Since test signals VIT and VIR are inserted in the vertical blanking period, they are also regarded as effective video signals. Thus, the number of effective video lines in one field period is selected to be 252. In other words, an effective frame is selected and may be arranged, for example, so that the first or odd field thereof includes video information in lines 12-263 and the second or even field thereof includes video information in lines 274-525. In this manner, each of the odd and even fields of each frame includes 252 field lines of video information.

Interface 38 combines the signals from channels Y, U and V into a serialized signal, as shown in FIG. 13, comprised of 192 sets $S_n$ for each line. The digitized effective video region of the color video signal is then divided by interface 38 of the digital VTR into two channels. In particular, each set $S_n$ is alternately distributed to two channels, as shown in FIGS. 14A and 14B. The two channels of video information are then further divided by interfaces 40M and 40N, respectively, into four channels AB, CD, EF and GH, as shown in FIGS. 14C, 14D, 14E and 14F. For example, with 768 samples per line, data corresponding to sets $(4n+1)$ are assigned to channel AB, data corresponding to sets (4n+3) are assigned to channel CD, data corresponding to sets (4n+2) are assigned to channel EF, and data corresponding to sets (4n+4) are assigned to channel GH. The data of the four channels are processed in the same manner and only one channel will be described. The data in any one of the channels, for example, channel AB, is derived as a record signal for heads 20A and 20B after being applied, in sequence, to a time base compression circuit 42AB, an error correcting or control encoder 44AB, a recording processor 46AB and recording amplifiers 48A and 48B. The recording amplifiers 48A–48H are connected by way of a rotary transformer (not shown) to rotary heads 20A–20H, respectively, disposed in close proximity to each other.

The code arrangement of each of the recorded signals respectively provided at heads 20A to 20H will now be described with reference to FIG. 11. As there shown, a block B of the coded digitized signal is composed of 105 samples (840 bits) in which a block synchronizing signal (SYNC) of three samples (24 bits), an identifying (ID) and address (AD) signal of two samples (16 bits), information data of 96 samples (768 bits) and a CRC (Cyclic Redundancy Check) code of four samples (32 bits) are arranged one after another. The data of one line or horizontal period of the color video signal comprises 192 samples per channel (96 per head), as previously mentioned, and these samples are divided into two blocks, that is, there are two blocks for each line of each channel, with 96 samples for each block. In other words, each block B includes data for one-eight of a line in each channel. The block synchronizing signal is used for identifying the beginning if a block, whereupon the identifying and address signals, the information data and/or CRC code can be extracted. The identifying signals ID indicate the channel (track), the frame, the field and the line to which the information data of the block belongs, and the address signal AD represents the address of the respective block. The CRC is used for the detection of an error in the information data of the respective block.

FIG. 10 shows the code arrangement for one field in one channel. In FIG. 10, each reference character Bi (i = 1~570) indicates one block, with two blocks making up one line. Since the effective video region of one field is comprised of 252 lines, as mentioned previously, the data of 252 blocks (504 blocks) exists in one field for each channel. The video information data of a particular field are sequentially arranged in a 21×24 matrix form. Parity data are also provided in connection with the horizontal and vertical directions, respectively, of the video information data in the matrix. More particularly, in FIG. 10, the parity data for the horizontal direction is shown positioned in the twenty-fifth and twenty-sixth columns of blocks, and the parity data for the vertical direction is positioned in the twenty-second row at the bottom. The parity data for the horizontal direction is formed in two ways by 12 blocks respectively taken out of the 24 blocks forming one row of the matrix. In the first row, for example, parity data $B_{25}$ is formed by the modulo 2 addition:

$$[B_1] \oplus [B_3] \oplus [B_5] \oplus \ldots \oplus [B_{23}] = [B_{25}].$$

In the above, [Bi] means only the data in the respective block Bi. In this case, samples belonging to respective ones of the 12 blocks are each calculated in a parallel, 8-bit form. Similarly, by the modulo 2 addition:

$$[B_2] \oplus [B_4] \oplus [B_6] \oplus \ldots \oplus [B_{24}] = [B_{26}]$$

parity data $[B_{26}]$ is formed. The parity data is similarly formed for each of the second to twenty-first rows in the horizontal direction. Enhancement of the error correcting ability results from the fact that parity data is not formed merely by the data of the 24 blocks included in a row, but is formed by the data of 12 blocks positioned at intervals of two blocks in the row.

The parity data for the vertical direction is formed by the data of 21 blocks in each of the first to twenty-four columns of blocks. In the first column, parity data $[B_{547}]$ is formed by the modulo 2 addition:

$$[B_1] \oplus [B_{27}] \oplus [B_{53}] \oplus \ldots [B_{521}] = [B_{547}].$$

In this case, samples belonging to each one of the 21 sub-blocks are calculated in a parallel, 8-bit form.

Accordingly, these parity data comprise 105 samples as is also the case with the video data blocks. In the case of transmitting the digitized signal of one field of the above matrix arrangement (22×26) as a series of first, second, third, ... twenty-second rows in sequence, since 26 blocks correspond to the length of 12H, a period of 12×22=264H is needed for transmitting the digital signal of one field. In other words, since the number of samples in each block B is 105 and the number of blocks per field in each channel is 570 (actually 572 if the block corresponding to the vertical parity data for the horizontal parity data are included), the number of samples per channel for each field is 105×572=60,060 samples. Further, since there are 4 channels and 910 samples per line, the number of horizontal periods needed for transmitting the video signal of one field is (60,060×4)/910=264H.

Incidentally, if the VTR is of the C-format type, and thus employs an auxiliary head for recording and reproducing one part of the vertical blanking period in one field, then a duration of only about 250H can be recorded with a video head. In accordance with the present invention, a duration of 264H, leaving a margin of several H's, has to be recorded in each track, that is, the period of 264H of data to be transmitted is time-base-compressed (with a compression ratio Rt of 41/44) to a period a duration of 246H. Further, a pre-amble signal and post-amble signal, each having the transmitting bit frequency, are inserted at the beginning and the terminating end of the record signal of one field having the period of 264H.

The time base compression circuits 42AB, 42CD, 42EF and 42GH compress the video data with the above-noted compression ratio 41/44 and provide a data blanking period in which the block synchronizing signal, the identifying and address signals and the CRC code are inserted for each block of video data of 96 samples, and at the same time, set up data blanking periods in which the blocks of the parity data are inserted. The parity data for the horizontal and vertical directions and the CRC code of each block are generated by error control encoders 44AB, 44CD, 44EF and 44GH. The block synchronizing signal (SYNC) and the identifying (ID) and address (AD) signals are added to the video data in recording processors 46AB, 46CD, 46EF and 46GH. The address signal AD represents the previously-noted number (i) of the block. Further, in each of recording processors 46AB, 46CD, 46EF and 46GH there is provided an encoder of the block coding type which converts the number of bits of one sample from 8 to 10, and a parallel-to-serial converter for serializing the parallel 10-bit code. As disclosed in detail in U.S. Pat. application Ser. No. 06/171,481, filed July 23, 1980 and having a common assignee herewith, the block coding is such that $2^8$ codes whose DC levels are close to zero are selected from $2^{10}$ codes of 10-bit words and arranged to have one-to-one correspondence to the original 8-bit codes. By means of the foregoing, the DC level of the recorded signal is made as close to zero as possible, that is, "0" and "1" alternate with each other as much as possible. Such block coding is employed for preventing degradation of the transmitting waveform on the playback side by substantial DC free transmission. It may also be possible to achieve the same results by employing a scramble system utilizing the so-called M-sequence which is substantially random in place of the block coding. It should be appreciated that by means of such code conversion, the low frequency signal components of the digital video signal are substantially reduced so that, for example, only signal components with frequencies higher than approximately 1.3 MHz are produced, as previously described in regard to FIG. 6. The recording processors 46AB, 46CD, 46EF and 46GH convert the code converted digital signal from parallel to serial form and then transmit the blocks sequentially to the respective heads. In the case where each sample comprises 8 bits, the transmitting bit rate per channel, after converting the above 8-bit code to the 10-bit code, is as follows:

$(4f_{sc}) \times 8 \times \frac{1}{4} \times 44/41 \times 10/8 = 38.4 \ Mb/sec.$ This, of course, is the previously-described frequency $f_s$ in FIG. 6.

Figure 15:
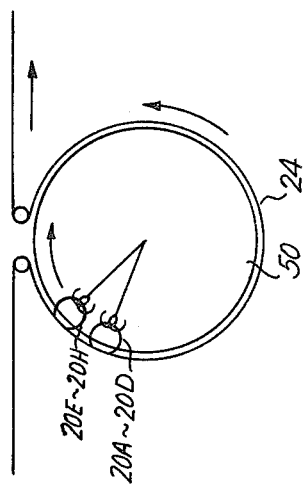
FIG. 15 is a schematic diagram illustrating the positional and azimuth angle relationship between the eight magnetic heads of the recording and reproducing sections of FIGS. 7 and 8.
Figure 16:
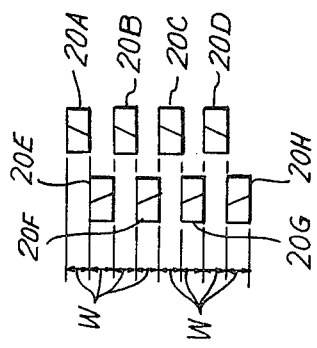
FIG. 16 is a schematic diagram of a rotary head assembly included in the digital VTR of FIGS. 7 and 8.
Figure 17:
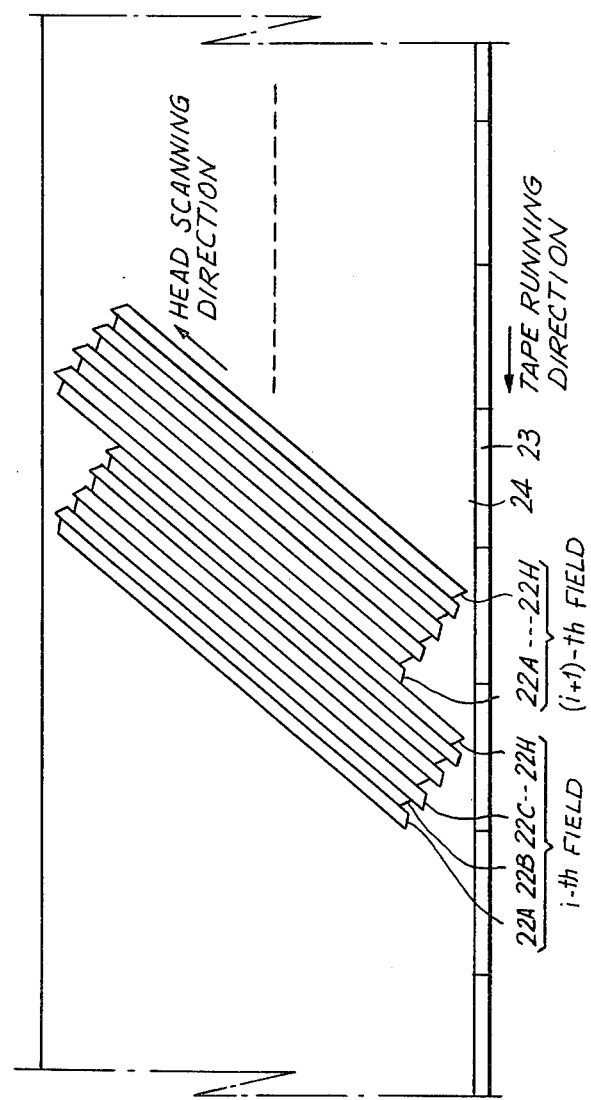
FIG. 17 a schematic plan view of a section of magnetic tape showing tracks in which the signals are recorded by the recording section of FIG. 7.

The serially arranged digital signals in each channel are respectively supplied through recording amplifiers 48A–48H to respective rotary magnetic heads 20A to 20H, which are arranged as shown in FIGS. 15 and 16. In particular, each of heads 20A to 20H has a height selected equal to the track width W. Further, heads 20A–20D are mounted on a rotary drum 50 and aligned in the vertical direction with a distance W therebetween, and the other heads 20E–20H are also mounted on rotary drum 50 and aligned in the vertical direction with a distance W therebetween. Heads 20A–20H are arranged in close proximity to one another so that, for example, head 20B(20E) is positioned in the vertical direction between heads 20E (20A) and 20F (20B). Further, heads 20A–20D are selected to have the same azimuth angle $\theta/2$, for example, 7° in one direction, and heads 20E–20H are selected to have the same azimuth angle $\theta/2$, for example, 7° in the direction opposite to that of heads 20A–20D. In this manner, the differential azimuth angle $\theta_d$ between adjacent tracks is 14°.

Heads 20A–20H are rotated together with rotary drum 50 in synchronism with the color video signal at the field frequency, and a magnetic tape 24 contacts the peripheral surfaces of heads 20A–20H and rotary drum 50 over an angular range of about 360° in a slant omega ($\Omega$) configuration, and the tape is driven at a constant speed. Accordingly, as shown in FIG. 17, the digitized signals from channels AB, CD, EF and GH are respectively recorded on tape 24 by heads 20A–20H in tracks 22A–22H, respectively, each track corresponding to one field. A control track 23 is also formed at the lower longitudinal edge of tape 24. In this case, the distance W between respective ones of the heads 20A–20H is equal to the track width W, so that adjacent tracks 22A–22H contact each other at the longitudinal edges thereof without any guard bands therebetween. Further, if the rotary radius of each of heads 20A–20H and the speed of tape 24 are suitably selected, track 22A of each field may contact track 22H of the following field at the respective longitudinal edges thereof, a shown in FIG. 17. Further, since the azimuth angles of the heads are alternately opposed to one another, the azimuth angles of tracks 22A–22H are also alternately opposed to each other so as to minimize cross-talk interference between adjacent tracks.

It is to be appreciated that if each of the reproduced digital video signals from the various tracks are processed separately during reproduction, the apparatus would become relatively complicated and expensive. For example, during a special reproducing mode in which each head traces a plurality of tracks, the interchanger that must be provided to distribute the reproduced signals to the correct channels becomes complicated in construction and use. In addition, in such case, maintenance and check of the apparatus is inconvenient and troublesome. Further, different VTRs vary in complexity. For example, a low-grade VTR, such as an ENG (electronic news gathering) machine, may use less channels than a standard VTR which, in turn, may use less channels than a high-grade mastering VTR. If common reproduction processing apparatus is provided for all of the above machines, such apparatus, which separately processes the signals reproduced from each track, must include processing circuitry capable of being used with the most complex or high-grade mastering VTR. For example, if the high-grade mastering VTR uses sixteen channels, a complex interchanger must be provided for correctly separating the channels during a special reproducing mode. If it is desired to use a simple ENG machine, the same complex interchanger must be used. This, of course, is unnecessary. However, because the signals are recorded in adjacent tracks with different azimuth angles, the reproduced signals from adjacent tracks cannot merely be combined for processing. Thus, in accordance with the present invention, digitized signals recorded in tracks with the same azimuth angle are grouped together during reproduction and processed separately in such groups. In this manner, the processing of the signals becomes much simpler and the maintenance and check of the apparatus to ensure correct reproduction also becomes simpler. For example, the interchanger used in each group is much simpler than the complex interchanger of the prior art since each interchanger does not operate on all of the channels, but only the channels in its group. Further, the apparatus according to this invention can easily be used with any complexity machine by merely varying the number of groups used in accordance with the complexity or grade of the VTR.

Figure 8:
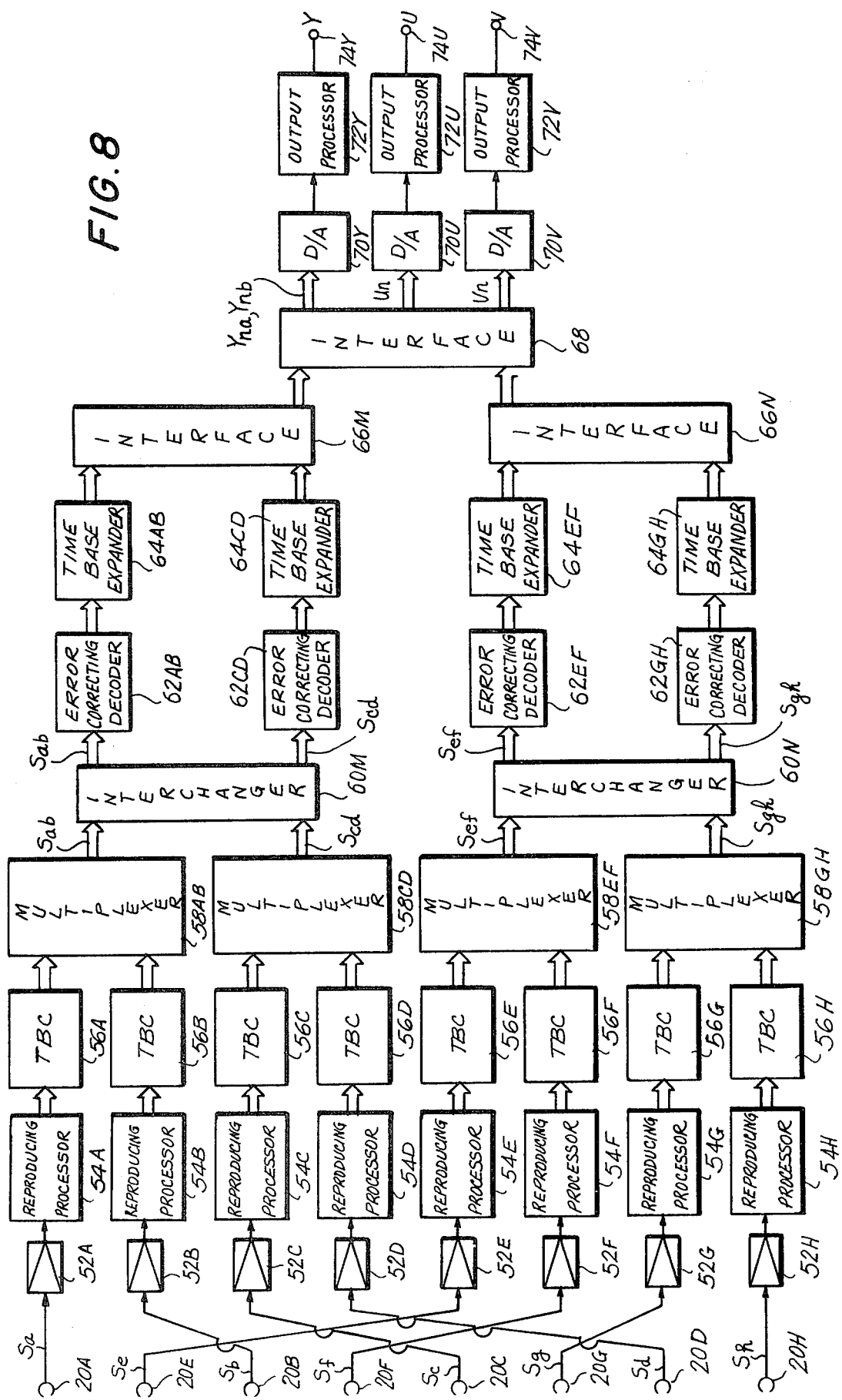
FIG. 8 is a block diagram illustrating a reproducing section of a digital video tape recorder (VTR) which is complementary to recording section of FIG. 7.

In the reproducing or playback portion of the digital VTR according to this invention, as shown in FIG. 8, the reproduced signals are derived from reproducing heads 20A–20H which scan tracks 22A–22H, respectively, corresponding thereto, and are applied through playback amplifiers 52A–52H to respective waveform shaping circuits (not shown). Each of the waveform shaping circuits includes a playback equalizer for increasing the high-frequency component of the reproduced signal and shapes the reproduced signal to a clear pulse signal. Further, each waveform shaping circuit extracts a reproducing bit clock synchronized with the pre-amble signal and supplies the reproducing bit clock to respective playback processors 54A–54H together with the data. In each of playback processors 54A–54H, the serial data is converted to parallel form, the block synchronizing signal is extracted, the data is separated from the block synchronizing signal and from the ID, AD and CRC codes or signals, and further, block decoding or 10-bit to 8-bit conversion is performed. The resulting data is applied to time base correctors 56A–56H, respectively, in which time base errors (or axis fluctuations) are removed from the data. Each of time base correctors 56A–56H is provided with, for example, four memories, in which reproduced data are sequentially written by clock pulses synchronized with the reproduced data, and the data are sequentially read out from the memories, by reference clock pulses. When the reading operation is likely to get ahead of the writing operation, the memory from which the data has just been read is read again.

The data of channels A and B is provided from respective time base correctors 56A and 56B to a multiplexer 58AB. In like manner, data of channels C and D, E and F, and G and H are provided from respective time base correctors therein to multiplexers 58CD, 58EF and 58GH, respectively. In multiplexer 58AB, digital signals from the A and B channels are processed in a time sharing manner, that is, sets from each channel are alternated with one another, as shown in FIG. 14C. In like manner, digital signals from the C and D channels, the E and F channels, and the G and H channels are alternated with one another in multiplexers 58CD, 58EF and 58GH, respectively, as shown in FIGS. 14D, 14E and 14F.

It is to be appreciated that, during a normal reproducing mode, heads 20A–20H scan traces which coincide with tracks 22A–22H, respectively, which had been recorded previously on tape 24. The usual tracking servo control circuitry (not shown) operates to insure this proper tracking of each track by its correct head. Thus, data recorded in tracks 22A–22H are reproduced by heads 20A–20H, respectively. Each head scans only its associated track so as not to reproduce data of different channels. However, during special reproducing modes, such as slow-motion, quick search, still or reverse modes, heads 20A–20H may traverse tracks 22A–22H so as to reproduce data of its own track as well as data of different tracks. Hence, head 20A may traverse tracks 22A–22H so as to reproduce data of such tracks. Similarly, each of heads 20B–20H also reproduces data from different tracks. Consequently, time base corrector 56A, for example, may be supplied with blocks from channel A, followed by blocks from channel B, followed by blocks from channel C, and so on, all reproduced by head 20A. In such case, blocks from channels A–H would be supplied to the field memory included in error correcting decoder 62AB, thereby resulting in significant interference and degradation of the video information in channel AB. Similar degradation obtains for the video information in channels CD, EF and GH and, as a consequence thereof, the recorded video information cannot be recovered. The video picture which ultimately is reproduced from this information will appear largely as interference and noise. Accordingly, data interchangers 60M and 60N are provided so as to avoid this difficulty. It may be appreciated that, during a normal reproducing mode, data interchangers 60M and 60N are not needed. However, for special reproducing modes, the data interchangers function to direct channel AB data to error correcting decoder 62AB, to direct channel CD data to error correcting decoder 62CD, to direct channel EF data to error correcting decoder 62EF, and to direct channel GH data to error correcting decoder 62GH, regardless of the particular playback head which reproduces that data. Hence, even if head 20C reproduces channel A data when it traverses track 22A, data interchanger 60M nevertheless directs this channel A data, which will be supplied to data interchanger 60M by time base corrector 56C and multiplexer 58CD, to error correcting decoder 62AB. In the above case, interchangers 60M and 60N discriminate the data from the channels based upon the track identification signals. It is to be appreciated that interchanger 60M only proceses signals that had been recorded with the same first azimuth angle, while interchanger 60N only processes signals that had been recorded with the same second azimuth angle different from the first azimuth angle.

The data of each channel AB, CD, EF and GH is provided from the respective ones of the multiplexers 58AB, 58CD, 58EF and 58GH to respective error correcting decoders 62AB, 62CD, 62EF and 62GH. Each error correcting decoder 62AB, 62CD, 62EF and 62GH includes error detecting and correcting circuits using CRC, horizontal and vertical parities, a field memory and so on. In particular, each error correcting decoder includes a field memory, and data is written into each field memory at every block B in response to, for example, the respective address signal AD thereof. At this time, any error in the data is corrected for every block B of information by the CRC code and horizontal and vertical parity data. If the error is too great to be corrected by the CRC code and the parity data, the writing in of data of that block B in the field memory is not performed, and instead, data from the previous field is read out again.

The data from error correcting decoders 62AB, 62CD, 62EF and 6GH is supplied to respective time base expander circuits 64AB, 64CD, 64EF and 64GH, which return the data to the original transmitting rate. The data from time base expander circuits 64AB and 64CD is then supplied to an interface 66M which combines the signals, as shown in FIG. 14A. In like manner, the data from time base expander circuits 64EF and 64GH is supplied to an interface 66N which combines the signals, as shown in FIG. 14B. The outputs from interfaces 66M and 66N are then supplied to an interface 68 which serves to return the reproduced data of two channels into three channels, that is, a luminance channel Y, a red difference signal channel U and a blue difference signal channel V, each of which includes a D/A converter circuit 70Y, 70U and 70V, respectively, for conversion of the data into analog form.

The outputs from D/A converter circuits 70Y, 70U and 70V are applied to output processors 72Y, 72U and 72V, from which a reproduced color video signal is provided at output terminals 74Y, 74U and 74V, respectively. An external reference signal may be supplied to a master clock generator (not shown), from which clock pulses and a reference synchronizing signal are provided to a control signal generator (not shown). The control signal generator provides control signals synchronized with the external reference signal, such as various timing pulses, identifying signals for the line, field and frame, and sample clock pulses. These signals are used for processing of the signals in the reproducing section of FIG. 8.

Thus, in accordance with the present invention, if it is desired to use the processing apparatus of the reproducing section of FIG. 8 with a high-grade mastering VTR having sixteen heads, it becomes easy to add two more circuit groups. In such case, the complexity of the apparatus is reduced since the signals are arranged in groups. Also, the interchangers 60M and 60N and the two added interchangers in the two added circuit groups are much less complex than a single interchanger that would have to distribute sixteen channels. The complexity of the apparatus could then be reduced when using a standard VTR with eight heads, as shown in FIG. 8, by merely not using the two added circuit groups. In other words, the single complex interchanger would not be used with the less complex standard VTR.

Having described specific preferred embodiments of the invention with reference to the accompanying drawings, it is to be understood that the invention is not limited to those precise embodiments, and that various changes and modificatons may be effected therein by one skilled in the art without departing from the scope or spirit of the invention as defined in the appended claims.

What is claimed is:

1. Apparatus for reproducing a digitized information signal which has been simultaneously recorded in at least three parallel tracks on a record medium without guard bands therebetween and with said digitized information signal in adjacent ones of the tracks being recorded with different azimuth angles, said apparatus comprising:
   means for reproducing said digitized information signal from said at least three parallel tracks;
   means for grouping said reproduced digitized information signal into at least two groups, each group including only those portions of said reproduced digitized information signal that were recorded with the same azimuth angle, and each group including portions of said reproduced digitized information signal that were recorded with a different azimuth angle than portions of said reproduced digitized information signal in at least one other group; and
   means for processing said reproduced digitized information signal separately for each group.

2. Apparatus according to claim 1; in which each group includes portions of said reproduced digitized information signal that were recorded with a different azimuth angle then portions of said reproduced digitized information signal in any other group.

3. Apparatus according to claim 1; in which said digitized information signal is recorded in alternate ones of said tracks with a first azimuth angle and in the remaining ones of said tracks with a second azimuth angle which is different from said first azimuth angle; and in which said means for grouping groups said reproduced digitized information signal into two groups, one of said groups including only those portions of said reproduced digitized information signal that were recorded with said first azimuth angle and the other one of said groups including only those portions of said reproduced digitized information signal that were recorded with said second azimuth angle.

4. Apparatus according to claim 3; in which said digitized information signal is simultaneously recorded in eight parallel tracks on said record medium; said means for reproducing includes eight transducer means for reproducing said digitized information signal from said eight parallel tracks; said one of said groups includes only those portions of said digitized information signal reproduced from alternate ones of said tracks; and said other one of said groups includes only those portions of said digitized information signal reproduced from the remaining ones of said tracks.

5. Apparatus according to claim 1; in which each group includes portions of said digitized information signal reproduced from at least two tracks; and said means for processing includes means for serially combining portions of said digitized information signal reproduced from at least two tracks for each group.

6. Apparatus according to claim 5; in which said digitized information signal is simultaneously recorded in eight parallel tracks on said record medium; said means for grouping groups said reproduced digitized information signal into two groups, one of said groups including portions of said digitized information signal reproduced from four of said tracks and the other of said groups including portions of said digitized information signal reproduced from the remaining four tracks; and said means for serially combining includes first multiplexer means in each group for combining portions of said digitized information signal reproduced from two of said tracks associated with the respective group to form a first combined signal and second multiplexer means in each group for combining portions of said digitized information signal reproduced from the remaining two of said tracks associated with the respective group to form a second combined signal.

7. Apparatus according to claim 6; in which said means for serially combining includes interface means in each group for combining said first and second combined signals in each respective group.

8. Apparatus according to claim 1; further including interface means for combining the portions of the reproduced digitized information signal from each group.

9. Apparatus according to claim 1; in which said means for processing includes time base correction means for removing time base errors from said reproduced digitized information signal in each group; error correcting means for correcting errors in said reproduced digitized information signal in each group; and time base expansion means for varying the transmission rate of the reproduced digitized video signal in each group.

10. Apparatus according to claim 1; in which said means for processing includes a plurality of interchanger means each associated with only one group for distributing said portions of said digitized information signal in the respective group to correct channels in said respective group.

11. Apparatus for recording and reproducing an information signal with respect to a record medium, comprising:
   a recording section including:
   means for converting said information signal into digital form; and
   means for simultaneously recording said digitized information signal in at least three parallel tracks on said record medium without guard bands therebetween and with said digitized information signal in adjacent ones of the tracks being recorded with different azimuth angles; and
   a reproducing section including:
   means for reproducing said digitized information signal from said at least three parallel tracks;

means for grouping said reproduced digitized information signal into at least two groups, each group including only those portions of said reproduced digitized information signal that were recorded with the same azimuth angle, and each group including portions of said reproduced digitized information signal that were recorded with a different azimuth angle than portions of said reproduced digitized information signal in at least one other group; and means for processing said reproduced digitized information signal separately for each group.

12. Apparatus according to claim 11; in which said information signal is a color video signal and said means for converting includes means for sampling said color video signal at a frequency which is at least two times the color sub-carrier frequency of the color video signal and analog- to-digital converting means for converting the sampled color video signal into digitized form.

13. Apparatus according to claim 12; in which said recording section includes interface means for distributing digitized portions of the color video signal from said analog-to-digital converting means sequentially to a plurality of channels.

14. Apparatus according to claim 13; in which each of said channels includes time base compression means supplied with respective portions of said digitized video signal from said interface means for compressing said respective portions supplied thereto; error control encoding means supplied with said respective portions from said time base compression means for generating error control data from said respective portions supplied thereto and for adding said error control data to the digitized video signal comprised of said respective portions; and recording processor means for adding synchronizing, identifying and address signals to said digitized video signal comprised of said respective portions from said error control encoding means; and said means for simultaneously recording includes transducer means associated with each channel for recording the output from the respective recording processor means for each channel in at least one of said plurality of parallel tracks.

15. Apparatus according to claim 14; including four channels and in which said transducer means includes eight transducers, each associated with a respective one of said four channels for recording the output from the recording processor means of the respective channel in one of said plurality of parallel tracks, with the digitized video signal in alternate ones of said parallel tracks being recorded with an azimuth angle which is different from the azimuth angle in the remaining alternate ones of the parallel tracks.

16. Apparatus according to claim 15; further including a rotary drum assembly adapted for rotatable movement, and in which said eight transducers are secured to said rotary drum assembly and adapted to rotate therewith, a first set of four of said transducers having an air gap with a first azimuth angle and separated from each other by the width of one of said parallel tracks in the vertical direction of said guide drum assembly, and a second set of the other four of said transducers having an air gap with a second azimuth angle different from said first azimuth angle and separated from each other by the width of one of said parallel tracks in the vertical direction of said guide drum assembly.

17. A method of reproducing a digitized information signal which has been simultaneously recorded in at least three parallel tracks on a record medium without guard bands therebetween and with said digitized information signal in adjacent ones of the tracks being recorded with different azimuth angles, said method comprising the steps of:

reproducing said digitized information signal from said at least three parallel tracks;

grouping said reproduced digitized information signal into at least two groups, each group including only those portions of said reproduced digitized information signal that were recorded with the same azimuth angle and each group including portions of said reproduced digitized information signal that were recorded with a different azimuth angle than portions of said reproduced digitized information signal in at least one other group; and processing said reproduced digitized information signal separately for each group.

18. The method according to claim 17; in which each group includes portions of said reproduced digitized information signal that were recorded with a different azimuth angle than portions of said reproduced digitized information signal in any other group.

19. The method according to claim 17; in which said digitized information signal is recorded in alternate ones of said tracks with a first azimuth angle and in the remaining ones of said tracks with a second azimuth angle which is different from said first azimuth angle; and in which said step of grouping includes the step of grouping said reproduced digitized information signal into two groups, one of said groups including only those portions of said reproduced digitized information signal that were recorded with said first azimuth angle and the other one of said groups including only those portions of said reproduced digitized information signal that were recorded with said second azimuth angle.

20. The method according to claim 19; in which said digitized information signal is simultaneously recorded in eight parallel tracks on said record medium; said one of said groups includes only those portions of said digitized information signal reproduced from alternate ones of said tracks; and said other one of said groups includes only those portions of said digitized information signal reproduced from the remaining ones of said tracks.

21. The method according to claim 17; in which each group includes portions of said digitized information signal reprocuded from at least two tracks; and said step of processing includes the step of serially combining portions of said digitized information signal reproduced from at least two tracks for each group.

22. The method according to claim 21; in which said digitized information signal is simultaneously recorded in eight parallel tracks on said record medium; said step of grouping includes the step of grouping said reproduced digitized information signal into two groups, one of said groups including portions of said digitized information signal reproduced from four of said tracks and the other of said groups including portions of said digitized information signal reproduced from the remaining four tracks; and said step of serially combining includes a first step of combining portions of said digitized information signal reproduced from two of said tracks associated with each respective group to form a first combined signal for each group and a second step of combining portions of said digitized information signal reproduced from the remaining two of said tracks associated with each respective group to form a second combined signal.

23. The method according to claim 22; in which said step of serially combining includes a third step of combining said first and second combined signals in each group.

24. The method according to claim 17; further including the step of combining the portions of the reproduced digitized information signal from each group.

25. Apparatus according to claim 17; in which said step of processing includes the steps of removing time base errors from said reproduced digitized information signal in each group; correcting errors in said reproduced digitized information signal in each group; and varying the transmission rate of the reproduced digitized video signal in each group.

26. The method according to claim 17; in which said step of processing includes the step of distributing said portions of said digitized information signal in each respective group to correct channels in said respective group.

27. A method of recording and reproducing an information signal with respect to a record medium, comprising the steps of:
converting said information signal into digital form;
simultaneously recording said digitized information signal in at least three parallel tracks on said record medium without guard bands therebetween and with said digitized information signal in adjacent ones of the tracks being recorded with different azimuth angles;
reproducing said digitized information signal from said at least three parallel tracks;
grouping said reproduced digitized information signal into at least two groups, each group including only those portions of said reproduced digitized information signal that were recorded with the same azimuth angle, and each group including portions of said reproduced digitized information signal that were recorded with a different azimuth angle than portions of said reproduced digitized information signal in at least one other group; and
processing said reproduced digitized information signal separately for each group.

* * * * *